Figure 1:
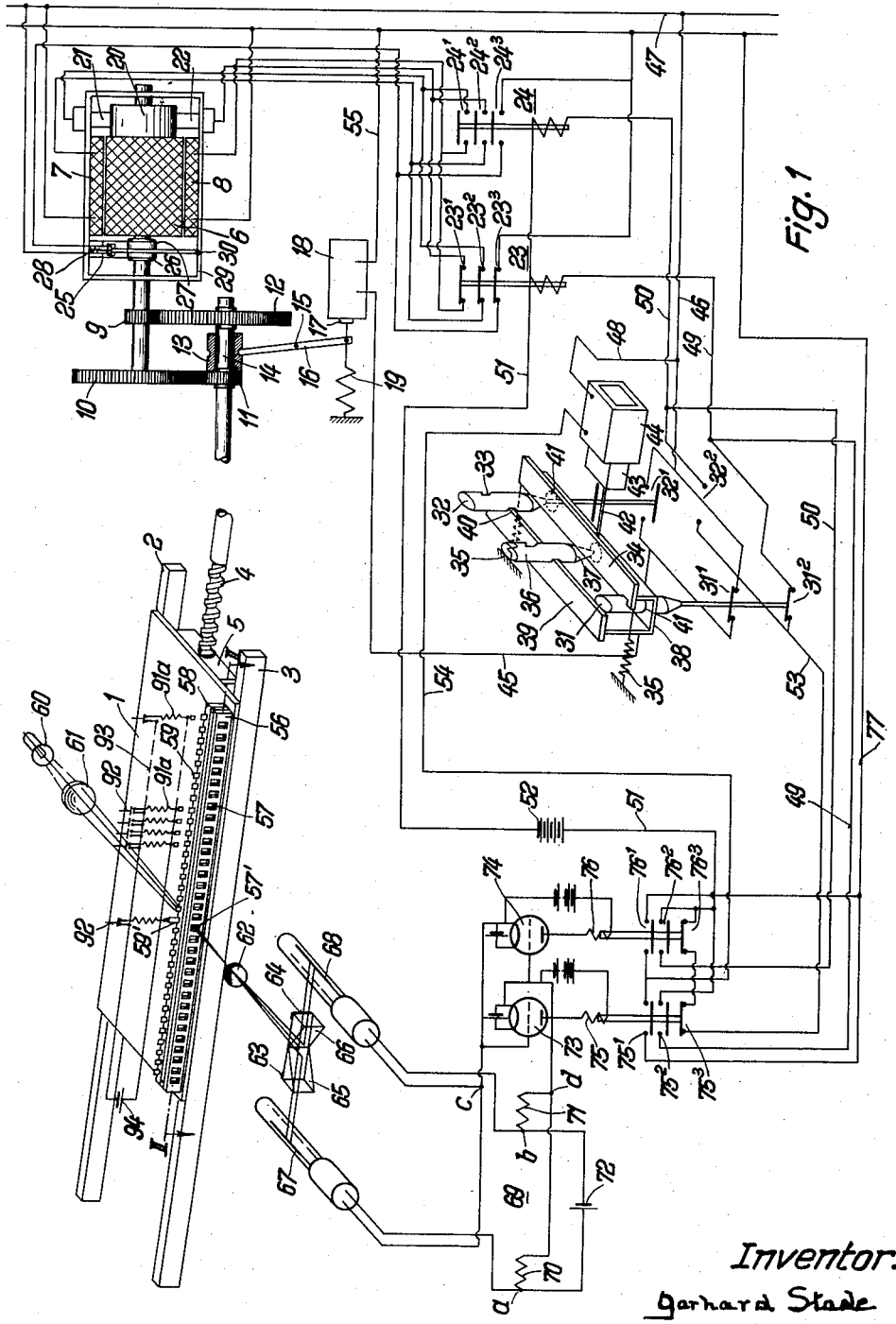

Inventor:
Gerhard Stade

Feb. 3, 1959 G. STADE 2,871,716
DEVICE FOR ADJUSTING AND CONTROLING THE POSITION
OF MOVABLE MACHINE PARTS FOR EXAMPLE
IN MACHINE TOOLS
Filed April 23, 1956 4 Sheets-Sheet 2
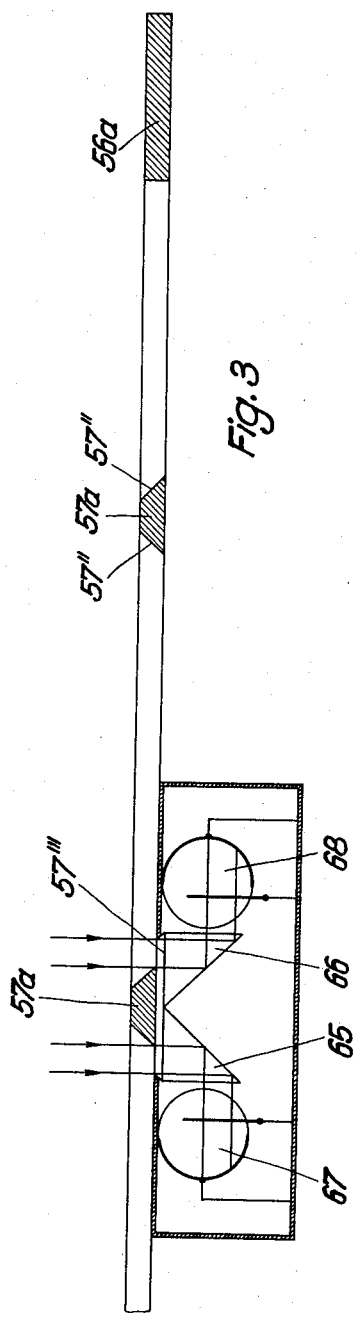
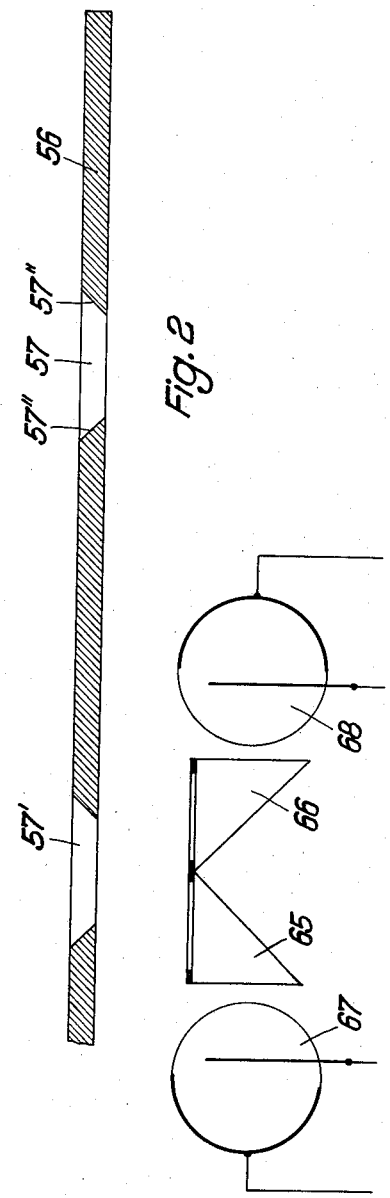
Inventor:
Gerhard Stade Feb. 3, 1959 G. STADE 2,871,716
DEVICE FOR ADJUSTING AND CONTROLING THE POSITION
OF MOVABLE MACHINE PARTS FOR EXAMPLE
IN MACHINE TOOLS
Filed April 23, 1956 4 Sheets-Sheet 3
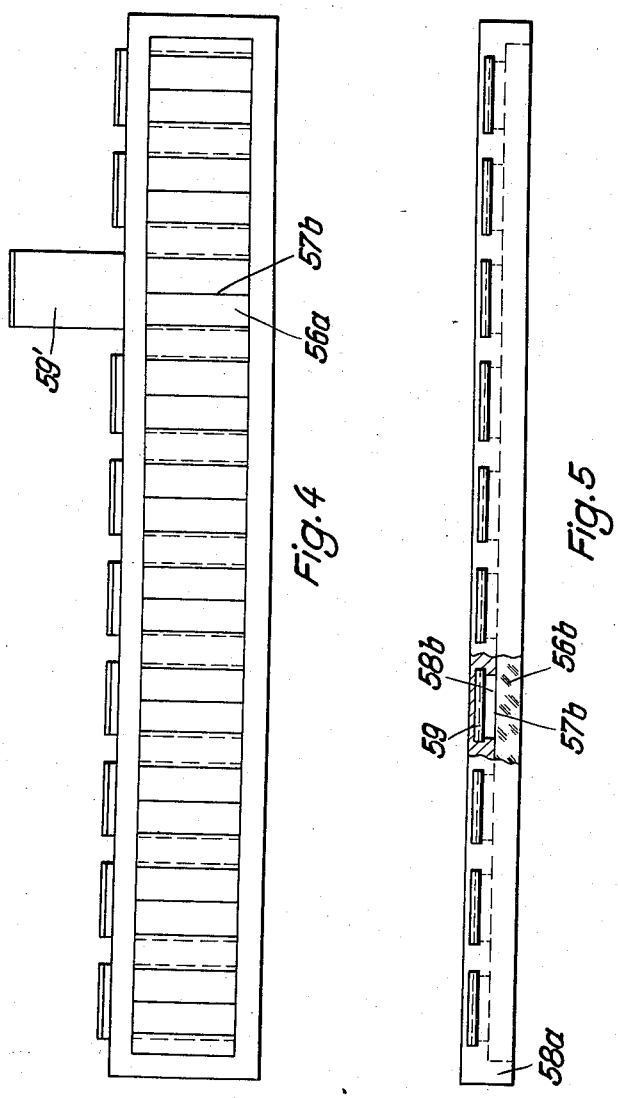
Inventor:
Gerhard Stade United States Patent Office 2,871,716
Patented Feb. 3, 1959

2,871,716

DEVICE FOR ADJUSTING AND CONTROLLING THE POSITION OF MOVABLE MACHINE PARTS FOR EXAMPLE IN MACHINE TOOLS

Gerhard Stade, Frankfurt am Main-Sud, Germany, assignor to Herbert Lindner G. m. b. H., Berlin-Wittenau, Germany, a corporation of Germany Application April 23, 1956, Serial No. 579,882

Claims priority, application Germany April 29, 1955

8 Claims. (Cl. 74—472)

My invention relates to devices for controlling with an extremely high degree of accuracy the positioning of movable machine parts, such as work-tables of machine tools and more particularly to such devices where the feed motion shortly prior to reaching the exact position is switched over to slow motion by then actuated electrical means and on reaching the exact position by photoelectric control means is stopped by the image of a scale graduation mark being projected upon a photoelectric cell.

It is known to control the traverse of a carriage or sliding member of a machine tool by one or more photoelectric cells. It is also known to change the traversing gear from rapid motion over to slow motion and to use photoelectric control for stopping said slow motion. The distances have been set by means of a coarse scale and a fine scale; contacts on the coarse scale effected a switching over to slow motion, while the following slow motion was stopped when the photoelectric cell was shaded by the scale graduation lines projected thereupon by means of an intermediate screen conforming to the said graduation line groups.

However, the images of graduation lines and of gaps, as well as illuminated lines and gaps without intermediate images, are particularly in view of the diffraction of light, no images which along their edges allow sudden increases of brightness from zero to a very high value. For instance, when the image of a graduation line is projected upon a gap in such a way that it just about fills the gap a residual brightness will occur behind the gap as the image of the graduation line is weakened by diffraction. The switching means connected with the photoelectric cell, therefore, will never be free of current, but after the coincidence of gap and line a photoelectric current will be generated according to the optical image conditions particularly the brightness of the light source used for generating the image. This light source being inserted in a circuit subjected to certain fluctuations, and in addition undergoing itself changes in the course of service, this residual current will also be subjected to temporary variations so that such kind of photo-electric precision adjustment will not operate accurately especially not to automatically stop the setting operation.

To rectify this unavoidable disadvantage caused by the oscillation it has been suggested to compensate the fluctuations of two photoelectrically generated currents, as soon as the desired precise setting has been obtained, in a bridging circuit and to effect the desired positioning by the equal currents their values being readable in the zero position of an indicating instrument. The setting of a desired distance, indicated in this manner, is highly accurate. However, it is only possible to read the attained precise position from the zero value of the indicator whereas changing the quicker feed motion to slow motion must be done by hand by means of a coarse scale or, by means of contacts. An object of the present invention resides in having the feed motion changed over to slow motion without any electrical switching means being actuated in accordance with the setting on a coarse scale. This is done by having the feed motion changed over to slow motion through photoelectrical control by means of the projected image of the graduation line of a scale or the like. This control als regulates the standstill of the traverse. Such means amplify the operation of the machine because the coarse scale, along with contacts had to be shifted, is eliminated and only one scale is needed which controls the feed motion until shortly before the movable machine part to be positioned reaches its exact desired position in its normal feed motion, and thereupon the exact position by slow motion.

One preferred embodiment of the invention comprises two photoelectric cells arranged in the ray of the projected image in an electric bridge circuit and current-direction-actuating switching means arranged in the bridge balance circuit which means control in accordance with the switched-in feed direction the slow traverse either to the right or to the left until the moving machine part has been stopped.

It is another object of the invention to automatically switch in a return movement of the part to be traversed until the exact setting position has been reached, in case the exact positioning, for instance in view of the size of the moved masses of the sliding carriage of the machine tool, has been overrun when the slow motion has been switched off. This is effected by the switching means arranged in the bridge balance circuit reversing the slow motion into opposite direction when the precise measuring position has been overrun. A particular suitable embodiment consists therein that each one of the two photoelectric cells has a relay with change-over contacts for respective right and left movement which are connected to switches for switching-in the feed motion to right or left, respectively. This feed motion can be switched in by two contactors situated in the circuit of the feed motor and the circuit of the closed contactor in quesion on coming into action with one of the relays is switched off from the contacts of the switches, switched over to the contacts of the relay in question; at the same time the gearing in the motor drive is changed over to slow motion, and the maintained circuit for the contactor on the relay's dropping is interrupted when the bridge currents because of uniform illumination of the photoelectric cells in the bridge balance circuit are compensated.

It is a further object of the invention to provide means which make it impossible to switch-in the normal feed and/or rapid traverse when it is already connected for slow motion. For this purpose each relay is provided with contacts in parallel connection for connecting a tripping magnet which locks all switches against a reconnection until the exact setting has taken place at slow speed. In order to quickly brake the traverse when the setting has been reached it is suitable to actuate an electrically controlled brake acting on the feed motor by each of the two contactors, which are contained in the circuit of the feed motor and control its clockwise and anti-clockwise rotation in such a way that on connecting one of the two contactors the brake is released, while up on the dropping of the two contactors the brake is actuated. Instead of the two contactors which are situated in the feed motor circuit and which control its clockwise and/or anticlockwise rotation, two contactors may be used which control the clockwise and/or anticlockwise rotation of the drive spindle with the aid of two electromagnetic couplings including intermediately arranged reversing gears, whereby when both magnets become currentless and both couplings are dropped the rotation of the drive spindle and therefore the traverse comes at once to a standstill, without that the mass of the driving motor, large in comparison to the masses of the other driving members, need be braked.

Suitable means for the control according to the invention comprise gaduation lines which have a width corresponding to be scale division so that light rays, projected thereupon fall upon prisms and are dispersed into two differently directed rays acting on the two photoelectric cells. The scale may be impervious to light and in its division and/or on the graduation lines have firmly positioned measuring gaps with sliding screens capable of closing or opening said gap, or the scale may be translucent and in its division and/or on the graduation lines have firmly positioned screens impervious to light which are narrower than a screen in the beam of the rays. It is suitable that the gaps or the screens are tapered at both their edges. Instead of screens fine graduation lines as known in graduated scales may be used, the lines not needed for the control of the setting movement being covered by screens impervious to light. The opened measuring gap and/or switched-in division line and/or the screens impervious to light correspond to a respective measuring position.

The above and other objects and advantages of the invention will be more readily apparent from the following description when read in connection with the accompanying drawing which shows in Fig. 1 a diagrammatic view of a control mechanism for positioning movable machine parts embodying the present invention;

Fig. 2 a longitudinal section of the used measuring means along line II—II in Fig. 1;

Fig. 3 a similar section of another embodiment of the measuring means;

Fig. 4 an elevational view of a third embodiment of the used measuring means;

Fig. 5 a plan view thereof, and

Figure 6:
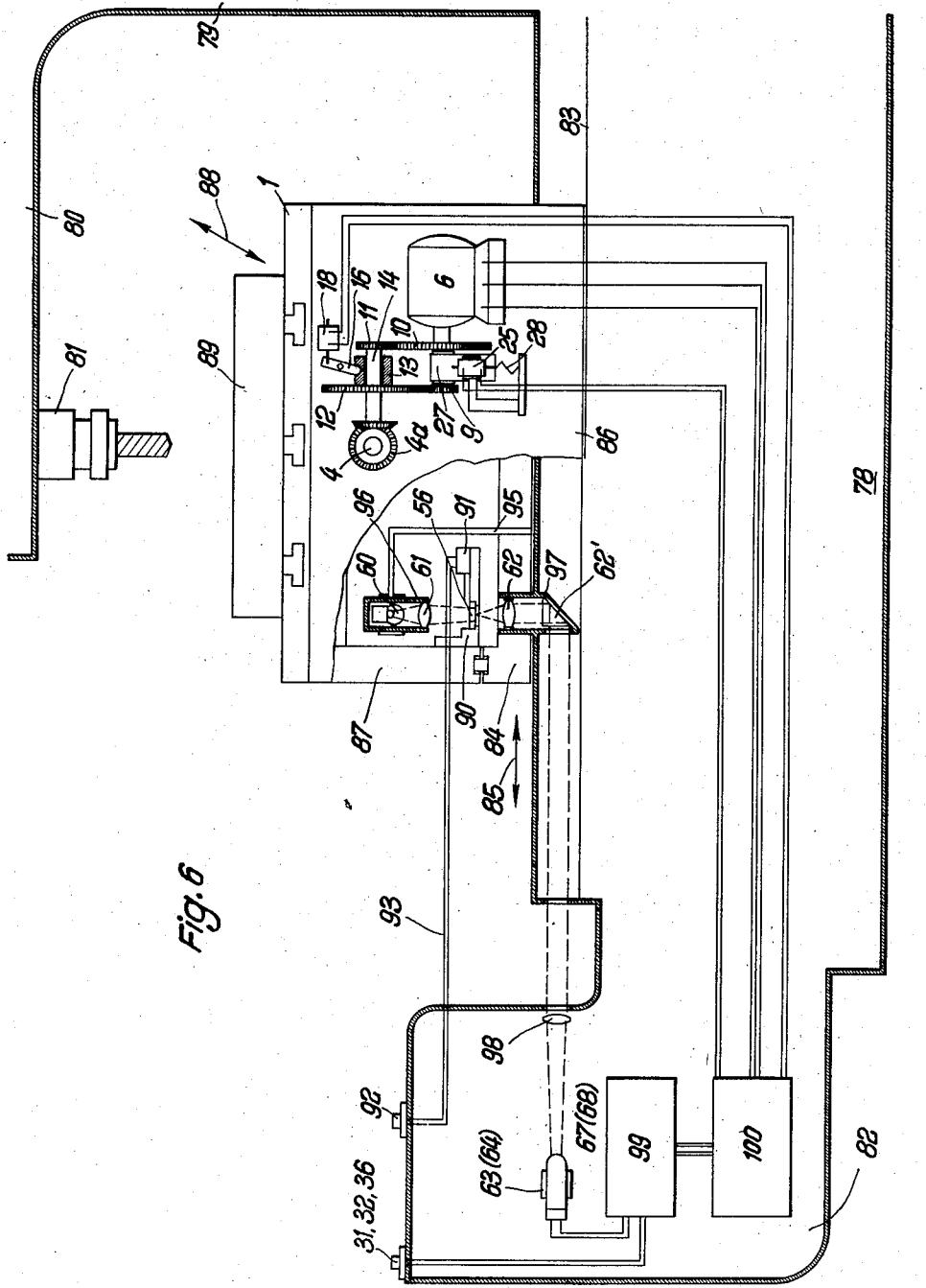

Fig. 6 a schematic side view of a machine tool with a control mechanism shown in Fig. 1.

The device shown in Fig. 1 of the drawing comprises a sliding member 1 of a machine for example of a machine tool, which is to be displaced and exactly positioned and which may be a measuring table, a sliding carriage or the like. The sliding member 1 moves in the guide ways 2 and 3 and is displaced by a threaded spindle 4 which rotates in a nut 5 rigidly connected to the slide 1. The spindle 4 is driven by a reversible electric motor 6 having field windings 7 and 8 over a change speed gear comprising the pinions 9, 10, 11, and 12, and a clutch 13. This clutch is movable on shaft 14 supporting the pinions 11 and 12 and connects said shaft 14, which drives the spindle 4, with either of said pinions 11 or 12. The left-hand position of the clutch 13 puts spindle 4 in high gear and thus effects a quick traverse of member 1, while the right hand position of the clutch 13 produces low gear and thus a slow traverse of sliding member 1. The clutch 13 is displaced by a lever 16 turning on fulcrum 15. The outer end of said lever is connected in opposing directions with a magnet keeper 17 of an electromagnet 18 and with a readjusting spring 19, respectively.

The anticlockwise and the clockwise rotations of the motor 6 are effected by having the inner outlets of the field windings 7 and 8 connected either directly or crosswise with the brushes 21 and 22 sliding on a collector 20, i. e. either field winding 7 with brush 21, and field winding 8 with brush 22, or field winding 7 with brush 22, and field winding 8 with brush 21. This change in the rotation of the motor is effected by the two relay switches 23 and 24, more particularly by their upper contacts 23' and 23² in such a way that on closing one of said switches the motor will rotate anti-clockwise, and on closing the other switch clockwise. Each of the two switches 23 and 24 is provided with still another contact 23³ and 24³, respectively which are connected in parallel and on opening of one of them will excite a magnet 25 to lift the motor brake. The brake pulley 26 sitting on the motor shaft is partly surrounded by a brake band 27 actuated by said magnet 25. In case that the magnet 25 is not excited the brake band is drawn by a spring 28 to the brake pulley 26. The brake band 27 is released by the magnet 25, which by a support 30 is rigidly connected to the motor casing 29, said magnet pulling said band 27 down against the action of spring 28 and thus lifting it from the brake pulley 26. Therefore, when switch 23 or 24 attracts in order to start motor 6 for anticlockwise or clockwise rotation the brake band 27 is simultaneously released while the brake closes at once under the action of the spring 28 when both switches 23 and 24 are held off.

The quick displacement of the slide member 1 is effected by switches constituted as pushkeys 31, 32. On pressing pushkey 31 the slide member moves at a normal or rapid speed, to the left, and on pressing pushkey 32 at a normal or rapid speed to the right. Each one of these pushkeys is self-locking being locked in its pressed-down position by a locking bar 34 which under the action of a tension spring 35 drops into the recess 33. The locking bar may be released by pressing the centre pushkey 36 which is not provided with a recess but, like the other pushkeys, with a taper 37 by which the locking bar 34 is displaced against the action of the tension springs 35 so that the quick traverse to the right or to the left respectively, may be interrupted. The locking bar 34 is connected by means of a frame 38 to a second locking bar 39 which is so arranged that when the pushkeys 31 and 32 are not depressed it drops into their recess 40 and locks said pushkeys in order to prevent them from being again pressed down before the setting operation which will be later explained has been terminated. The pushkeys 31, 32 and 36 pass through openings 41 and are spring-loaded so that they will have to be pressed down against the action of the springs (which are not shown) for initiating the setting operation. The locking bar 34 is connected to the armature 43 of a tripping magnet 44 by means of a bar 42. The upper contacts 31' and 32' of the pushkeys 31 and 32 are arranged in parallel and are connected through conduit 45 with the coupling magnet 18, through conduit 46 with the network 47 and starting from conduit 46 through conduit 48 with the tripping magnet 44. The lower contact 31² of pushkey 31 is connected for left-hand movement across conduit 49 to switch 23, and the lower contact 32² across conduit 50 for righthand movement to switch 24. Both switches 23 and 24 are connected to the source of current 52 across conduit 51. Contacts 31 and 32 are, in addition, connected to the joint conduit 53 and the tripping magnet 44 to conduit 54. The coupling magnet 18 is connected to the network 47 across conduit 55.

In front of the slide member 1 is a photo-electric control device which cooperates with the said pushkey control device.

Mounted on the slide member 1 is a measuring rod or scale or other measuring member 56 which in the shown embodiment is provided with a series of individual measuring gaps 57. Behind this measuring rod 56 is a bar 58 having gaps closable by individual slides 59. These slides may selectively be displaced to open or to close any gap. Each measuring gap 57 corresponds to a certain accurate position of slide member 1. In the drawing, slide 59' is lifted and thus the opened measuring gap 57' is exposed. The stationary light source 60 with condenser 61 illuminates the scale 56. The ray of light is projected through the opened gap 57' and having passed through the stationary object lens 62 strikes the two prisms 65 and 66 in the plane of the diaphragms 63 and 64. The two prisms reflect the light to the photoelectric cells 67 and 68 which are connected by an electric bridge circuit 69 containing two resistances 70 and 71. The current source 72 is joined at $a$—$b$ to the bridge circuit. Between the bridge points $c$ and $d$ there is connected in the bridge balance circuit an amplifier arrangement consisting of two amplifier valves or tubes 73 and 74. A relay 75 is in the anode circuit of the electron tube 73, and a relay 76 in the anode circuit of the electron tube 74. The bridge circuit is so arranged that according to the direction of the electric current in the bridge balance circuit either relay 75 or relay 76 will come into action. The top contacts 75′ and 76′ are connected in parallel with the two valves and connect on one hand with the network 47 across conduit 77 and on the other hand with the tripping magnet 44 across conduit 54. The center contacts 75² and 76² are on the one hand both connected to conduit 51 which leads to the switches 23 and 24, while on the other hand contact 75² is connected to conduit 49 leading to switch 23 and contact 76² connected to conduit 50 leading to switch 24. The lower contacts 75³ and 76³ are connected in series and are connected on the one hand to the control battery 52 across conduit 51, and on the other hand to contacts 31² and 32² of the pushkeys 31 and 32, respectively, across conduit 53. Contacts 75³ and 76³ are closed in the off-position of their respective relay while the other contacts of these relays are opened in their off-positions. The circuit for switching on one of the switches 23 or 24 is across the closed contacts 75³ and 76³, so that on closing of contact 31², when pushkey 31 is depressed, the switch 23 attracts. If, for instance, relay 75 attracts, the circuit for the switched-on switch 23 is interrupted by opening of contact 75³ and, in consequence of the operation of the tripping magnet, also by opening of contact 31², but the circuit is maintained across the then closed contact 75² which determines the switching-off of the switch when the setting position has been reached, namely when relay 75 drops in consequence of the equalizing current in the said bridge circuit. The circuit for switch 24 is also maintained across contact 76².

My new device operates as follows:

If the slide member 1 is to be displaced into a new position to the left pushkey 31 is depressed. Thereby the magnet 18 and the switch 23 are actuated and the quick traverse of the slide member to the left is initiated. As soon as the opened measuring gap 57′ enters the ray of light from the light source 60 the photo-electric cell 67 is illuminated first. Thereupon relay 75 attracts, actuates the tripping magnet 44, unlocks the pushkey 31, which springs upward, takes away the voltage from contact 31² by opening contact 75³ in order to safeguard against unintentional reswitching in and maintains the switched-in switch 23 across contact 75². The opening of contact 31′ deenergizes the coupling magnet 18 at the same moment and connects the clutch 13 under action of the tension spring 19 to the pinion 12 whereby the slow traverse of the slide member is initiated. As soon as the forward moving slide 1 has reached its exact position centrally opposite the open gap 57′ both photo-electric cells are uniformly illuminated. As both currents are in opposite direction to each other in the bridge balance circuit c—d they equalize each other and cause the relay 75 to drop and to interrupt the hitherto closed contacts 75′ and 75². On opening of contact 75² the switch 23 is finally disconnected whereby the circuit for motor 6 is interrupted; at the same time the motor brake comes into action by the opened contact 23³ so that the slow moving slide comes instantaneously to a stop. By means of the opened contact 75′ the tripping magnet 44 becomes deenergized and contact 75³ is being closed again whereby the no-voltage situation and rest position is restored.

When the movement of the slide member 1 is to be reversed to the right pushkey 32 is depressed thereby in an analogous manner switching in contactor 24 and the coupling magnet 18, so that the photoelectric control takes place across relay 76. In case the slow traverse of the slide 1 goes beyond the desired exact position in the one or other direction the two photo-electric cells will be differently illuminated and an accordingly directed current in the bridge balance circuit c—d will arise so that, if before relay 75 was disconnected, relay 76 will come into action and now, instead the previously switched-in left traverse, connects contactor 24 for right rotation of the motor for slow traverse, because the pushkey 32 is neither depressed nor can it be depressed being blocked by the bar 39. This setting operation will take place until the optically controlled exact slide position has been reached.

Fig. 2 shows in enlarged scale a longitudinal section through the scale or measuring rod 56 with measuring gaps 57. The edges 57″ of each measuring gap 57 are tapered so that the projected edges of these gaps are sharply defined.

Fig. 3 shows a modified embodiment of the scale shown in Fig. 1. The scale 56a is provided with non-transparent strips 57a but is transparent there between. The edges 57″ of these strips are tapered and the strips are narrower than the opening 57‴ of the diaphragm of the prisms 65, 66.

Figs. 4 and 5 show still another embodiment of said scale. The scale 56a is transparent being made of glass and is provided with graduation lines 57b constituting marks for the setting of the slide 1. It is mounted in a frame 58a in a convenient manner. The frame has openings 58b, closable by slides 59. One slide 59′ is shown drawn up in accordance with Fig. 1.

Fig. 6 shows a diagrammatical view of the control device mounted into a coordinate boring machine including the machine bed 78, the column 79, the boring head 80 with a spindle 81, and the control box 82. On the guideways 83 of the machine bed 78 the lower sliding carriage 84 traverses in direction of arrows 85. A wall 86, shown partly broken, is rigidly mounted to carriage 84. On top thereof is the upper sliding carriage 87 for longitudinal movement in direction of the arrows 88, said carriage carrying slide 1 with workpiece 89. By means of support 90 the scale 56 is firmly mounted to carriage 87. In addition, support 90 carries the electromagnetically actuated screening equipment 91 which is provided with the same number of electromagnets 91a as are slides 59, said electromagnets being controlled by the same number of pushbuttons 92 across conduits 93. The individual magnets 91a are actuated in the control box 82 by means of the pushbutton system 92. Fig. 6, however, shows only one of said pushbuttons. From system 92 a multiple-core cable 93, a current source 94 being switched-in, leads to the individual magnets 91a, as shown in Fig. 1.

The illumination equipment 96, comprising a light source 60, the condenser 61, as well as the collimator system 97, consisting of objective 62 and prism 62′, serves to project the image of the opened measuring gap 56 in infinity and is rigidly fixed to the lower sliding carriage 84 by means of the support 95. This image is projected upon the two photoelectric cells 67, 68 by an objective 98 mounted in the control box 82 across the double prism 63, 64. This arrangement is shown simplified in Fig. 6, where only one prism and one photoelectric cell are seen. The diagrammatic view 99 represents the bridge circuit including the amplifiers 73, 74 with relays 75, 76 of Fig. 1, and the diagrammatic view 100 the contractor control with switches 23, 24. The control box 82 is provided with pushbuttons 31, 32, and 36 for switching in and out, respectively, the traverses of the shown upper sliding carriage 87 by motor 6 which drives spindle 4 across bevel gears 4a and the gears 9, 10, 11, and 12. The remaining parts, i. e., the coupling magnet 18, which actuates lever 16 and is connected with clutch 13, and the parts of the motor brake 25 to 28 are the same as in Fig. 1. Motor 6 including its entire operating mechanism and brake equipment as well as the support for the spindle 4 are rigidly connected with wall 86 which is mounted to the lower sliding carriage 84. By means of scale 56 the longitudinal traverse of the upper slide 87 may be controlled in the direction of arrows 88 in the manner described above.

The traverse of the lower sliding carriage 84 in the direction of arrows 85 may be controlled analogously by a second arrangement of the same design. The scale 56 used for this purpose is provided in the lower sliding carriage 84 in the direction of the transverse motion 85, while an illuminating and collimator system, respectively, a driving equipment for the lower sliding carriage 84 consisting of a motor, a clutch, a gearing drive, a brake, and a spindle, are stationary in the machine bed 78. The control is effected by a second pushbutton system 92 and second pushbuttons 31, 32 and 36 for switching in and out, respectively. However, these parts are not shown in Fig. 6 for clearness sake.

As a matter of course, it is also possible to mount the bridge-, amplifier-, and relay circuits, respectively, as well as the contactor control of the switches 23, 24 in special switch boxes.

Switches 23 and 24 arranged in the circuit of the feed motor and controlling its clockwise and anticlockwise rotations, respectively, may be replaced by two switches which control the right and left hand motions of the spindle by means of two electromagnetic couplings cooperating with reversing gears. Both coupling magnets when free of current will disengage both couplings and effect instantaneous stopping of the traverse thus avoiding that the mass of the motor armature, which is large in relation to the masses of the other driving means, need be braked all at once. It is also possible to stop the slide traverse by brakes additionally acting upon the slide. By switching off the driving gear and braking the traverse the slide will stop when its exact position has been reached by the described optical means.

While a preferred embodiment of the invention has been shown and described in detail to illustrate the application of the principles of my invention it will be well understood that the same may be otherwise embodied without departing from such principles and without avoiding the scope of the appended claims.

What I claim as my invention is:

1. In a positioning mechanism for a movable machine part to be brought into a predetermined rest position after imparting to it an initial fast motion followed by a slow motion, the improvement comprising a reversible electric motor driving said machine part; a speedchange gear including electrically operated clutch means between said motor and said machine part to effect the said fast and slow motions of the latter; rodlike measuring means movable with said machine part and longitudinally extending in the direction of movement imparted to it; selectively exposable openings in said measuring means forming graduation marks thereof; a light source facing one side of said measuring means; photoelectric means facing the other side of said measuring means and responsive to rays of said light source; two electric circuits leading from said photoelectric means; each circuit including said clutch means and said motor; and switching means in each of said circuits responding to the photoelectric current arising therein and controlling said clutch means and said motor; the photoelectric current, arising first in one circuit, operating said clutch means changing the motion of said movable machine part from fast to slow and thereafter while extending into the other circuit stopping said motor thus arresting the movable machine part in a predetermined position.

2. In a positioning mechanism for a movable machine part to be brought into a predetermined rest position after imparting to it an initial fast motion followed by a slow motion, the improvement comprising a reversible electric motor driving said machine part; a speedchange gear including electrically operated clutch means between said motor and said machine part to effect the said fast and slow motions of the latter; rodlike measuring means movable with said machine part and longitudinally extending in the direction of movement imparted to it; selectively exposable openings in said measuring means forming graduation marks thereof; a light source facing one side of said measuring means; two photoelectric cells facing the other side of said measuring means and responsive to rays of said light source; two electric circuits leading from said photoelectric cells; each circuit including said clutch means and said motor; an electric bridge connection between said two circuits; and switching means in the bridge balance of said electric bridge responsive to one of the two directions of current to control said clutch means and said motor; the photoelectric current, arising first in one circuit, operating said clutch means changing the motion of said movable machine part from fast to slow and, thereafter while extending into the other circuit and thus equalizing the current in said bridge balance stopping said motor thus arresting the movable machine part in a predetermined position.

3. A mechanism according to claim 2 wherein the said switching means effect a reversal of the slow motion of the movable machine part if the same passes the predetermined rest position.

4. A mechanism according to claim 2 comprising two relays each being connected to one photoelectric cell and including change-over contacts for the right and left traverse of the movable machine part; two pushkeys each connected to one of said relays to switch in the right or left traverse; two contactors in the circuits of the driving motor to effect the said switching in; the circuit closed by one contactor on operation of one relay being switched off from the contacts of the pushkeys and changed over to the other relay while simultaneously the speedchange gear is changed to slow traverse, and the maintained circuit for the contactor being interrupted by the dropping of the relay when the electric currents in the bridge circuit resulting from an equal illumination of the photoelectric cells are compensated.

5. A mechanism according to claim 4 comprising a tripping magnet for locking the pushkeys against reconnection until the slow moving machine part has reached its predetermined rest position and contacts in each relay connected in parallel to actuate said tripping magnet.

6. A mechanism according to claim 4 comprising an electrically operated brake acting upon said driving motor and actuated by said two contactors controlling the direction of rotation of said motor, said brake being released when one of said contatctors is switched in and operating when both contactors are switched off.

7. A mechanism according to claim 4 comprising a driving spindle for the movable machine part; two electromagnetic slutches and a reversing gear cooperating therewith to effect the traverse of the movable machine part in both directions; and two contactors controlling the said traverses; the deenergized electromagnetic clutches interrupting the rotation of said driving spindle and arresting the movable machine part thus avoiding a sudden arresting of driving motor.

8. A mechanism according to claim 2 wherein the openings in the rodlike measuring means have a width corresponding to one graduation unit, optical prisms beyond said openings dividing the incoming rays of light in two pencil of rays of different direction and directing each divisional pencil of rays against one of said photoelectric cells.

References Cited in the file of this patent

UNITED STATES PATENTS

| | | |
|---|---|---|
| 2,311,142 | Turrettini | Feb. 16, 1943 |
| 2,710,934 | Senn | June 14, 1955 |